(12) United States Patent
Agon

(10) Patent No.: US 9,473,340 B2
(45) Date of Patent: Oct. 18, 2016

(54) ORTHOGONAL FREQUENCY DIVISION MULTIPLEXING POLAR TRANSMITTER

(71) Applicant: APPLE INC., Cupertino, CA (US)

(72) Inventor: Zohar Agon, Modiin (IL)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 14/570,738

(22) Filed: Dec. 15, 2014

(65) Prior Publication Data

US 2016/0173314 A1    Jun. 16, 2016

(51) Int. Cl.
*H04L 27/00* (2006.01)
*H04L 27/26* (2006.01)
*H04L 27/36* (2006.01)

(52) U.S. Cl.
CPC ......... *H04L 27/2637* (2013.01); *H04L 27/366* (2013.01)

(58) Field of Classification Search
USPC ........................................................ 375/296
See application file for complete search history.

(56) References Cited

U.S. PATENT DOCUMENTS

| | | | | | |
|---|---|---|---|---|---|
| 3,903,522 | A * | 9/1975 | Copeland | .................. | G01S 3/32 342/149 |
| 4,862,180 | A * | 8/1989 | Martin | ..................... | G01S 13/42 342/158 |
| 5,305,241 | A * | 4/1994 | Hayashi | ............. | G01D 5/24452 702/94 |
| 5,732,113 | A * | 3/1998 | Schmidl | ................ | H04L 5/0048 375/354 |
| 6,477,477 | B1 * | 11/2002 | Thron | ................... | H03F 1/3247 702/86 |
| 6,874,006 | B1 * | 3/2005 | Fu | .......................... | H04L 27/22 708/442 |
| 7,715,493 | B2 * | 5/2010 | Ravi | ....................... | H03F 3/217 375/296 |
| 8,140,031 | B2 * | 3/2012 | Tsfati | .................... | H04B 17/13 375/296 |
| 8,542,616 | B2 * | 9/2013 | Staszewski | .......... | H03D 7/1441 370/295 |
| 8,693,459 | B2 * | 4/2014 | Youn | .................... | H04B 10/532 370/350 |

(Continued)

FOREIGN PATENT DOCUMENTS

| | | | | |
|---|---|---|---|---|
| EP | 1302042 A2 * | 4/2003 | ............... | H04L 1/02 |
| EP | 1302042 B1 | 5/2010 | | |

OTHER PUBLICATIONS

Kimball et al..; Asbeck, P., "50% PAE WCDMA basestation amplifier implemented with GaN HFETs," in Compound Semiconductor Integrated Circuit Symposium, 2005. CSIC '05. IEEE , vol., no., pp. 4 pp.-, Oct. 30-Nov. 2, 2005.*

(Continued)

*Primary Examiner* — Daniel Washburn
*Assistant Examiner* — Berhanu Tadese
(74) *Attorney, Agent, or Firm* — Fletcher Yoder PC

(57) ABSTRACT

Devices and methods for reducing and/or substantially preventing nonlinearities and discontinuities during the translation stage from an I/Q signal into a polar coordinate OFDM signal are provided. By way of example, a method includes receiving an incoming data signal via a processor of a transmitter. The method further includes computing one or more roots of a first function representing a phase component of the data signal, computing a second function representing the phase component, and deriving one or more characteristics of the phase component based on the second function. The method further includes adjusting one of the one or more characteristics in a second domain to establish a substantially finite bandwidth of the phase component.

24 Claims, 5 Drawing Sheets

(56) References Cited

U.S. PATENT DOCUMENTS

| | | | | |
|---|---|---|---|---|
| 9,093,960 | B2* | 7/2015 | McCallister | H03F 1/3247 |
| 2003/0206056 | A1* | 11/2003 | Hietala | H03C 3/222 |
| | | | | 330/100 |
| 2004/0208157 | A1* | 10/2004 | Sander | H03G 3/3047 |
| | | | | 370/345 |
| 2005/0046507 | A1* | 3/2005 | Dent | H03C 5/00 |
| | | | | 332/103 |
| 2005/0058219 | A1* | 3/2005 | Liu | H04L 25/03343 |
| | | | | 375/295 |
| 2005/0156662 | A1* | 7/2005 | Raghupathy | H03F 1/0222 |
| | | | | 330/10 |
| 2006/0033582 | A1* | 2/2006 | Staszewski | H03L 7/085 |
| | | | | 331/16 |
| 2006/0038710 | A1* | 2/2006 | Staszewski | H03F 3/24 |
| | | | | 341/143 |
| 2006/0092326 | A1* | 5/2006 | Tanabe | H04L 27/361 |
| | | | | 348/571 |
| 2006/0119493 | A1* | 6/2006 | Tal | H03M 7/3017 |
| | | | | 341/143 |
| 2006/0171484 | A1* | 8/2006 | Puma | H03C 5/00 |
| | | | | 375/295 |
| 2007/0011219 | A1* | 1/2007 | Neubauer | H04L 27/156 |
| | | | | 708/400 |
| 2007/0153930 | A1* | 7/2007 | Reid | H04L 25/0228 |
| | | | | 375/260 |
| 2007/0160164 | A1* | 7/2007 | Sahota | H03C 5/00 |
| | | | | 375/295 |
| 2007/0190952 | A1* | 8/2007 | Waheed | H04B 1/0475 |
| | | | | 455/114.3 |
| 2007/0230612 | A1* | 10/2007 | Ahmed | H03C 5/00 |
| | | | | 375/295 |
| 2008/0002788 | A1* | 1/2008 | Akhtar | H03B 19/14 |
| | | | | 375/298 |
| 2008/0055014 | A1* | 3/2008 | Tsfaty | H03B 19/00 |
| | | | | 332/127 |
| 2008/0150633 | A1* | 6/2008 | Zolfaghari | H03F 1/3211 |
| | | | | 330/149 |
| 2009/0004981 | A1* | 1/2009 | Eliezer | H03F 1/0211 |
| | | | | 455/127.1 |
| 2009/0033414 | A1* | 2/2009 | Rofougaran | H03G 3/00 |
| | | | | 330/133 |
| 2009/0074106 | A1* | 3/2009 | See | H03C 5/00 |
| | | | | 375/297 |
| 2009/0202018 | A1* | 8/2009 | Reddy | H04L 27/361 |
| | | | | 375/298 |
| 2009/0203345 | A1* | 8/2009 | Sorrells | H03C 1/62 |
| | | | | 455/313 |
| 2009/0258612 | A1* | 10/2009 | Zhuang | H03C 5/00 |
| | | | | 455/110 |
| 2009/0325509 | A1* | 12/2009 | Mattisson | H04B 1/525 |
| | | | | 455/75 |
| 2010/0130143 | A1* | 5/2010 | Collados Asensio | H04L 27/361 |
| | | | | 455/102 |
| 2010/0278228 | A1* | 11/2010 | Vromans | H03F 3/24 |
| | | | | 375/238 |
| 2012/0189081 | A1* | 7/2012 | Omoto | H03F 3/24 |
| | | | | 375/298 |
| 2012/0300870 | A1* | 11/2012 | Dickey | H04L 27/12 |
| | | | | 375/295 |
| 2013/0022151 | A1* | 1/2013 | McCune, Jr. | H04L 27/362 |
| | | | | 375/298 |
| 2013/0034188 | A1* | 2/2013 | Rashev | H04L 25/03063 |
| | | | | 375/297 |
| 2014/0016723 | A1* | 1/2014 | Mu | H04B 1/62 |
| | | | | 375/296 |
| 2014/0172935 | A1* | 6/2014 | Frei | H03H 17/06 |
| | | | | 708/317 |
| 2014/0307825 | A1* | 10/2014 | Ostrovskyy | H03F 3/2175 |
| | | | | 375/286 |
| 2015/0124907 | A1* | 5/2015 | Li | H03F 1/0294 |
| | | | | 375/320 |

OTHER PUBLICATIONS

Zhuang et al., "A Technique to Reduce Phase/Frequency Modulation Bandwidth in a Polar RF Transmitter," in Circuits and Systems I: Regular Papers, IEEE Transactions on , vol. 57, No. 8, pp. 2196-2207, Aug. 2010.*

Menz, Maik, "IIR filter design for audio DSP programmers", 2013—Internet Citation- Retrieved on Nov. 12, 2015 from http://www.yedey.com/wp-content/uploads/2013/05/IIR-filter-design-for-audio-DSP-programmers.pdf.*

Madich, P et al., "The Use of a Repetitive Differential Analyzer for Finding Roots of Polynomial Equations," in Electronic Computers, IRE Transactions on , vol.EC-8, No. 2, pp. 182-185, Jun. 1959.*

Zhuang, K.Waheed, R.B.Staszewski, "A Technique to Reduce Phase/Frequency modulation bandwidth in a polar RF transmitter", IEEE Transactions on circuits and systems, vol. 57, No. 8, Aug. 2010; 12 pgs.

C.P.Hughes, A.Nikeghbali, "The zeros of random polynomials cluster uniformly near the unit circle", Compositio Mathematica, 2008.

G.H.Golub, C.F.Van Loan, "Matrix computations", 3rd edition, 1996.

A.Edelman, H.Murakami, "Polynomial roots from companion matrix eigenvalues", Mathematics of Computation, vol. 64, No. 210 (1995), 763-776.

Staszewski, Robert Bogdan, et al.; "All-Digital TX Frequency Synthesizer and Discrete-Time Receiver for Bluetooth Radio in 130-nm CMOS"; IEEE Journal of Solid State Circuits, vol. 39, No. 12, Dec. 2004, 2278-2291.

* cited by examiner

ORTHOGONAL FREQUENCY DIVISION MULTIPLEXING POLAR TRANSMITTER

BACKGROUND

The present disclosure relates generally to polar transmitters, and more particularly, to polar transmitters included within electronic devices.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Transmitters and receivers are commonly included in various electronic devices, and particularly, portable electronic devices such as, for examples, phones (e.g., mobile and cellular phones, cordless phones, personal assistance devices), computers (e.g., laptops, tablet computers), internet connectivity routers (e.g., Wi-Fi routers or modems), radios, televisions, or any of various other stationary or handheld devices. One type of transmitter, known as a wireless transmitter, may be used to generate a wireless signal to be transmitted by way of an antenna coupled to the transmitter. Specifically, the wireless transmitter is generally used to wirelessly communicate data over a network channel or other medium (e.g., air) to one or more receiving devices.

The wireless transmitters may generally include subcomponents such as, for example, an oscillator, a modulator, one or more filters, and a power amplifier. Furthermore certain data modulation techniques that may be implemented by wireless transmitters may include a modulation of in-phase (I)/quadrature (Q) time samples of a signal into amplitude and phase signals. However, because the modulation from the I/Q samples to the amplitude and phase signals may be based on a nonlinear function, the amplitude and phase may include an very wide bandwidth (e.g., infinite bandwidth), and may thus include a number of nonlinearities or distortions (e.g., aliasing and unwrapping errors) upon completion of the modulation. Thus, the information to be transmitted may become distorted. It may be useful to provide more advanced and improved wireless transmitters.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Various embodiments of the present disclosure may be useful in reducing and/or substantially preventing nonlinearities and discontinuities during the translation stage from an I/Q signal into a polar coordinate orthogonal frequency division multiplexing (OFDM) signal. By way of example, a method includes receiving an incoming data signal via a processor of a transmitter. The method further includes computing one or more roots of a first function representing a phase component of the data signal, computing a second function representing the phase component, and deriving one or more characteristics of the phase component based on the second function. The method further includes adjusting one of the one or more characteristics in a second domain to establish a substantially finite bandwidth of the phase component.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

Embodiments of the present disclosure relate to techniques for reducing signal distortion in orthogonal frequency division multiplexing (OFDM) polar transmitters. For example, the present embodiments may include translating the frequency information of an in-phase/quadrature (I/Q) signal into phase and amplitude signals of the OFDM signal. Specifically, a polar modulator of the polar transmitter may preprocess the polar coordinate amplitude and phase of the incoming I/Q signal to calculate a constant phase angle, a substantially linear slope, and a period of the polar amplitude, and to adjust the slope of the polar phase signal in the time-domain to generate a characterization of a substantially finite bandwidth of the polar amplitude and phase signals. In this way, any nonlinearities or discontinuities (e.g., signal aliasing and unwrapping errors) in the translation of the OFDM symbols of the I/Q components into the polar form amplitude and phase signals may be reduced or substantially eliminated. Furthermore, the sampling rate of the polar transmitter may be reduced, and, by extension, the power consumption of the electronic device including the transmitter may be reduced.

Figure 1:
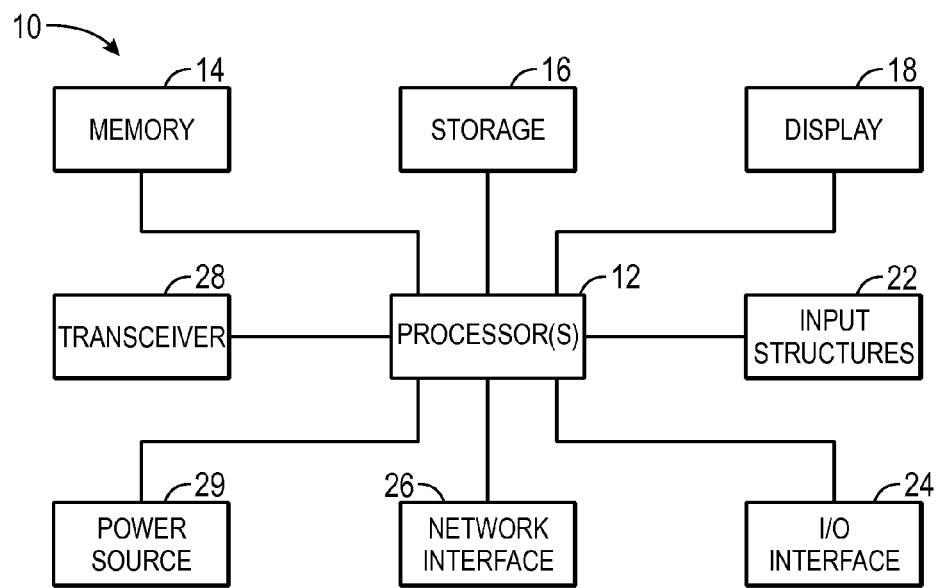
FIG. 1 is a schematic block diagram of an electronic device including a transceiver, in accordance with an embodiment.

With the foregoing in mind, a general description of suitable electronic devices that may employ polar transmitters and are useful in reducing and/or substantially preventing nonlinearities and discontinuities during the translation stage from an I/Q signal into a polar coordinate OFDM signal will be provided below. Turning first to FIG. 1, an electronic device 10 according to an embodiment of the present disclosure may include, among other things, one or more processor(s) 12, memory 14, nonvolatile storage 16, a display 18 input structures 22, an input/output (I/O) interface 24, network interfaces 26, a transceiver 28, and a power source 29. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in electronic device 10.

Figure 2:
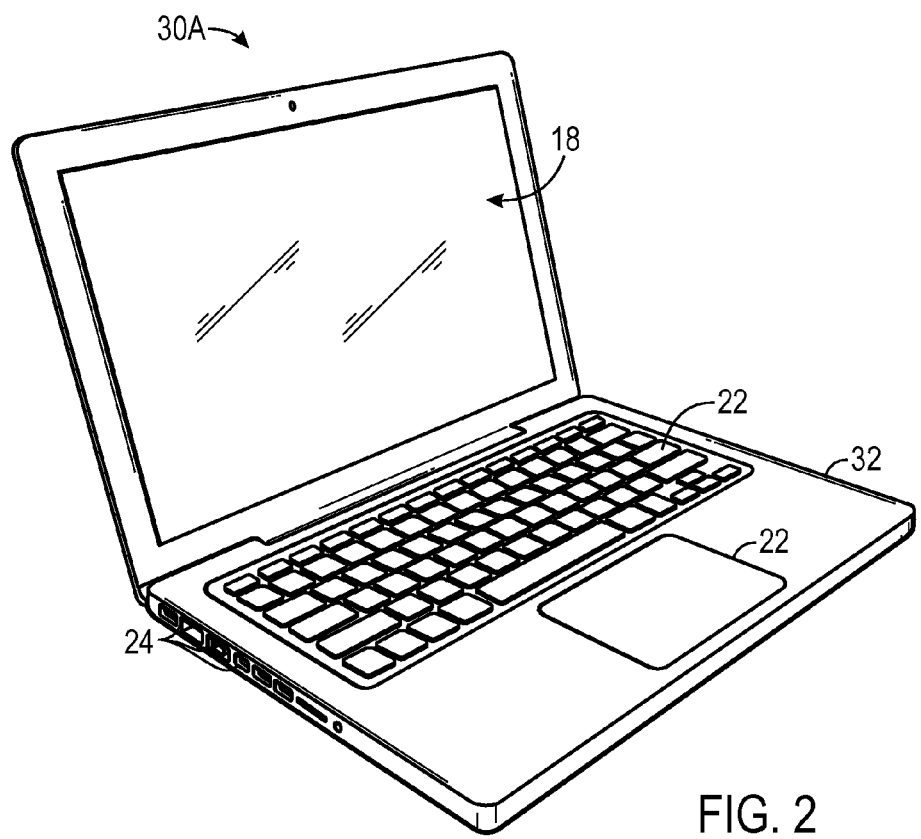
FIG. 2 is a perspective view of a notebook computer representing an embodiment of the electronic device of FIG. 1.
Figure 3:
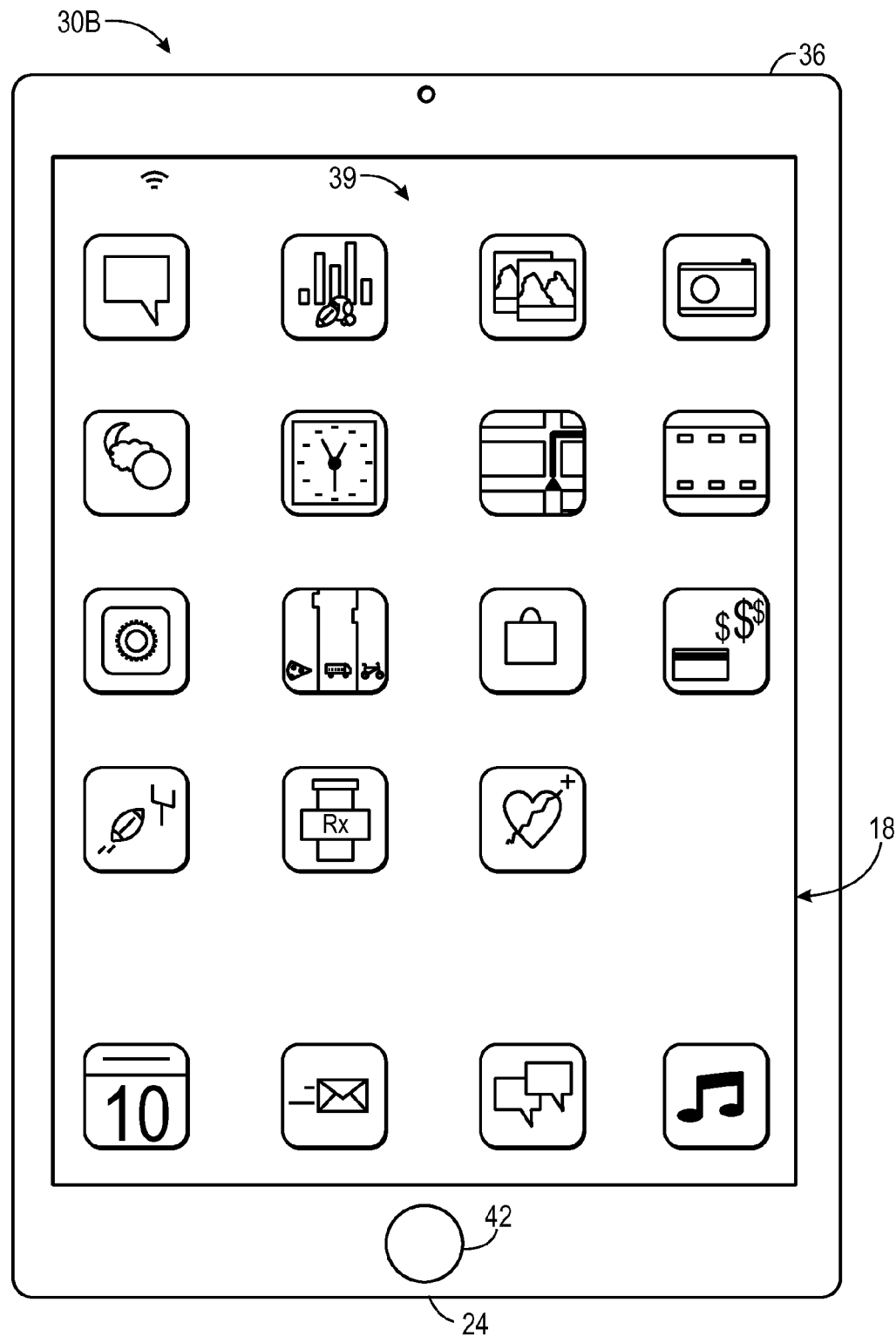
FIG. 3 is a front view of a hand-held device representing another embodiment of the electronic device of FIG. 1.
Figure 4:
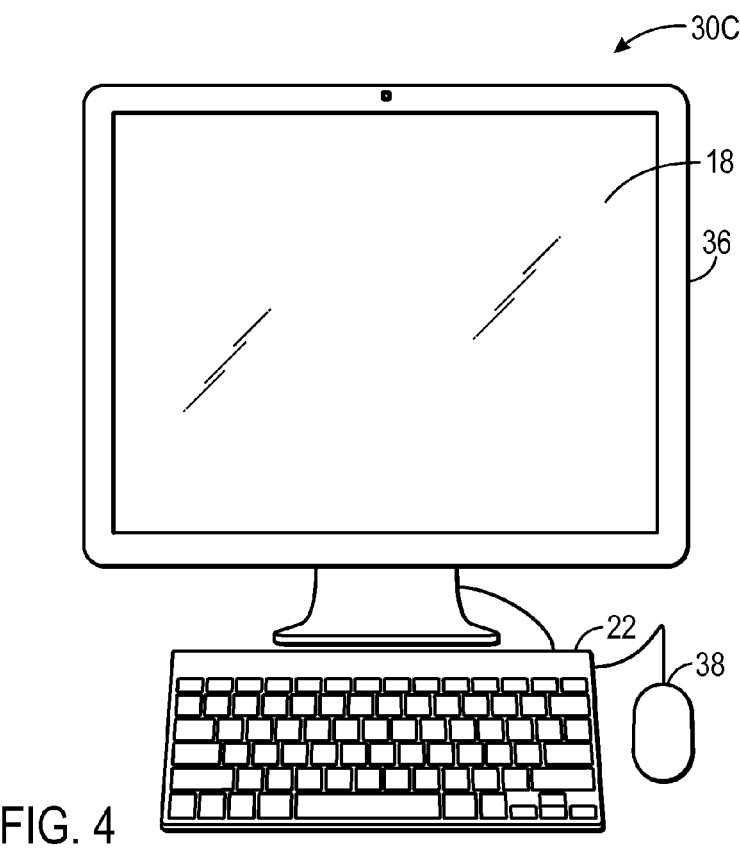
FIG. 4 is a front view of a desktop computer representing another embodiment of the electronic device of FIG. 1.
Figure 5:
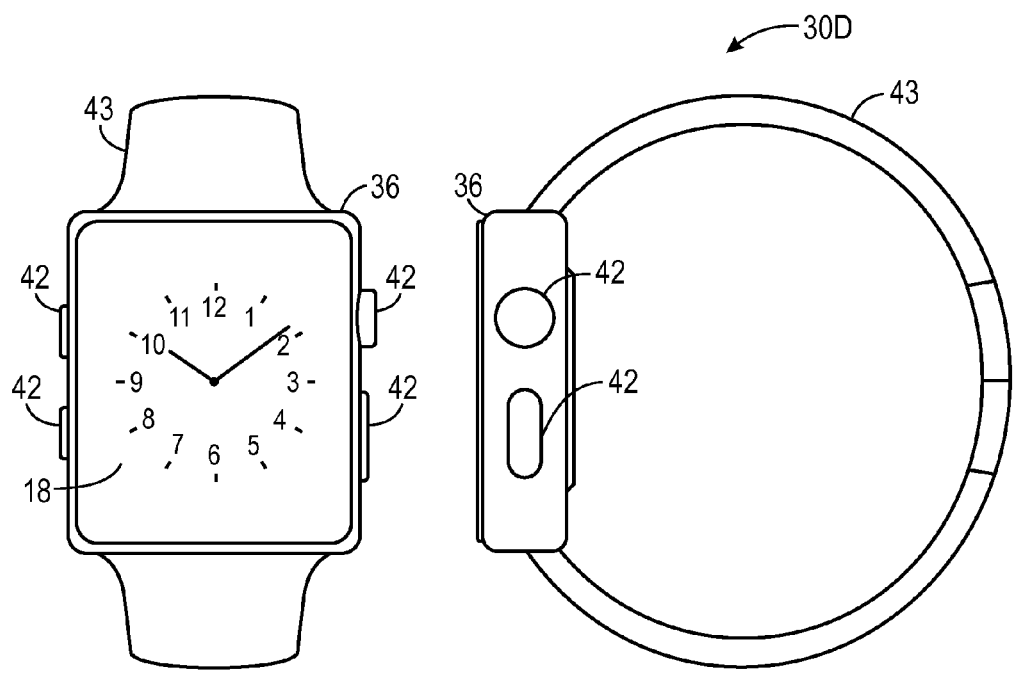
FIG. 5 is a front view of a wearable electronic device representing another embodiment of the electronic device of FIG. 1.

By way of example, the electronic device 10 may represent a block diagram of the notebook computer depicted in FIG. 2, the handheld device depicted in FIG. 3, the desktop computer depicted in FIG. 4, the wearable electronic device depicted in FIG. 5, or similar devices. It should be noted that the processor(s) 12 and/or other data processing circuitry may be generally referred to herein as "data processing circuitry." Such data processing circuitry may be embodied wholly or in part as software, firmware, hardware, or any combination thereof. Furthermore, the data processing circuitry may be a single contained processing module or may be incorporated wholly or partially within any of the other elements within the electronic device 10.

In the electronic device 10 of FIG. 1, the processor(s) 12 and/or other data processing circuitry may be operably coupled with the memory 14 and the nonvolatile memory 16 to perform various algorithms. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions that may be executed by the processor(s) 12 to enable the electronic device 10 to provide various functionalities.

In certain embodiments, the display 18 may be a liquid crystal display (LCD), which may allow users to view images generated on the electronic device 10. In some embodiments, the display 18 may include a touch screen, which may allow users to interact with a user interface of the electronic device 10. Furthermore, it should be appreciated that, in some embodiments, the display 18 may include one or more organic light emitting diode (OLED) displays, or some combination of LCD panels and OLED panels.

The input structures 22 of the electronic device 10 may enable a user to interact with the electronic device 10 (e.g., pressing a button to increase or decrease a volume level). The I/O interface 24 may enable electronic device 10 to interface with various other electronic devices, as may the network interfaces 26. The network interfaces 26 may include, for example, interfaces for a personal area network (PAN), such as a Bluetooth network, for a local area network (LAN) or wireless local area network (WLAN), such as an 802.11x Wi-Fi network, and/or for a wide area network (WAN), such as a $3^{rd}$ generation (3G) cellular network, $4^{th}$ generation (4G) cellular network, or long term evolution (LTE) cellular network. The network interface 26 may also include interfaces for, for example, broadband fixed wireless access networks (WiMAX), mobile broadband Wireless networks (mobile WiMAX), asynchronous digital subscriber lines (e.g., ADSL, VDSL), digital video broadcasting-terrestrial (DVB-T) and its extension DVB Handheld (DVB-H), ultra Wideband (UWB), alternating current (AC) power lines, and so forth.

In certain embodiments, to allow the electronic device 10 to communicate over the aforementioned wireless networks (e.g., Wi-Fi, WiMAX, Mobil WiMAX, 4G, LTE, and so forth), the electronic device 10 may include a transceiver 28. The transceiver 28 may include any circuitry the may be useful in both wirelessly receiving and wirelessly transmitting signals (e.g., data signals). Indeed, in some embodiments, as will be further appreciated, the transceiver 28 may include a transmitter and a receiver combined into a single unit, or, in other embodiments, the transceiver 28 may include a transmitter separate from the receiver. For example, as noted above, the transceiver 28 may transmit and receive orthogonal frequency division multiplexing (OFDM) signals (e.g., OFDM data symbols) to support data communication in wireless applications such as, for example, PAN networks (e.g., Bluetooth), WLAN networks (e.g., 802.11x Wi-Fi), WAN networks (e.g., 3G, 4G, and LTE cellular networks), WiMAX networks, mobile WiMAX networks, ADSL and VDSL networks, DVB-T and DVB-H networks, UWB networks, and so forth. As used herein, "orthogonal frequency division multiplexing (OFDM)" may refer to modulation technique or scheme in which a transmission channel may be divided into a number of orthogonal subcarriers or subchannels to increase data transmission efficiency. Further, in some embodiments, the transceiver 28 may be integrated as part of the network interfaces 26. As further illustrated, the electronic device 10 may include a power source 29. The power source 29 may include any suitable source of power, such as a rechargeable lithium polymer (Li-poly) battery and/or an alternating current (AC) power converter.

In certain embodiments, the electronic device 10 may take the form of a computer, a portable electronic device, a wearable electronic device, or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 30A, is illustrated in FIG. 2 in accordance with one embodiment of the present disclosure. The depicted computer 30A may include a housing or enclosure 32, a display 18, input structures 22, and ports of an I/O interface 24. In one embodiment, the input structures 22 (such as a keyboard and/or touchpad) may be used to interact with the computer 30A, such as to start, control, or operate a GUI or applications running on computer 30A. For example, a keyboard and/or touchpad may allow a user to navigate a user interface or application interface displayed on display 18.

FIG. 3 depicts a front view of a handheld device 30B, which represents one embodiment of the electronic device 10. The handheld device 30B may represent, for example, a portable phone, a media player, a personal data organizer, a handheld game platform, or any combination of such devices. By way of example, the handheld device 30B may be a tablet-sized embodiment of the electronic device 10, which may be, for example, a model of an iPad® available from Apple Inc of Cupertino, Calif.

The handheld device 30B may include an enclosure 36 to protect interior components from physical damage and to shield them from electromagnetic interference. The enclosure 36 may surround the display 18, which may display indicator icons 39. The indicator icons 39 may indicate, among other things, a cellular signal strength, Bluetooth connection, and/or battery life. The I/O interfaces 24 may open through the enclosure 36 and may include, for example, an I/O port for a hard wired connection for charging and/or content manipulation using a standard connector and protocol, such as the Lightning connector provided by Apple Inc., a universal service bus (USB), or other similar connector and protocol.

User input structures 42, in combination with the display 18, may allow a user to control the handheld device 30B. For example, the input structure 40 may activate or deactivate the handheld device 30B, the input structure 42 may navigate user interface to a home screen, a user-configurable application screen, and/or activate a voice-recognition feature of the handheld device 30B, the input structures 42 may provide volume control, or may toggle between vibrate and ring modes. The input structures 42 may also include a microphone may obtain a user's voice for various voice-related features, and a speaker may enable audio playback and/or certain phone capabilities. The input structures 42 may also include a headphone input may provide a connection to external speakers and/or headphones.

Turning to FIG. 4, a computer 30C may represent another embodiment of the electronic device 10 of FIG. 1. The computer 30C may be any computer, such as a desktop computer, a server, or a notebook computer, but may also be a standalone media player or video gaming machine. By way of example, the computer 30C may be an iMac®, a MacBook®, or other similar device by Apple Inc. It should be noted that the computer 30C may also represent a personal computer (PC) by another manufacturer. A similar enclosure 36 may be provided to protect and enclose internal components of the computer 30C such as the dual-layer display 18. In certain embodiments, a user of the computer 30C may interact with the computer 30C using various peripheral input devices, such as the keyboard 22 or mouse 38, which may connect to the computer 30C via a wired and/or wireless I/O interface 24.

Similarly, FIG. 5 depicts a wearable electronic device 30D representing another embodiment of the electronic device 10 of FIG. 1 that may be configured to operate using the techniques described herein. By way of example, the wearable electronic device 30D, which may include a wristband 43, may be an Apple Watch® by Apple, Inc. However, in other embodiments, the wearable electronic device 30D may include any wearable electronic device such as, for example, a wearable exercise monitoring device (e.g., pedometer, accelerometer, heart rate monitor), or other device by another manufacturer. The display 18 of the wearable electronic device 30D may include a touch screen (e.g., LCD, OLED display, active-matrix organic light emitting diode (AMOLED) display, and so forth), which may allow users to interact with a user interface of the wearable electronic device 30D.

In certain embodiments, as previously noted above, each embodiment (e.g., notebook computer 30A, handheld device 30B, computer 30C, and wearable electronic device 30D) of the electronic device 10 may include a transceiver 28, which may include an orthogonal frequency division multiplexing (OFDM) polar transmitter (e.g., WLAN OFDM polar transmitter). Indeed, as will be further appreciated, the polar transmitter may include a polar modulator (e.g., digital signal processor (DSP), coordinate rotation digital computer (CORDIC) processor) that may be used to translate the information of an incoming in-phase/quadrature (I/Q) component signal (e.g., Cartesian coordinates representation of an incoming data signal) into respective polar amplitude and phase signals (e.g., polar coordinates representation of the an incoming data signal).

Specifically, the polar modulator of the transmitter may preprocess the polar coordinate amplitude and phase of the incoming I/Q signal to calculate a constant phase angle, a substantially linear slope, and a period of the polar amplitude, and to adjust the slope of the polar phase signal in the time-domain. Indeed, the polar modulator may generate a characterization of a substantially finite bandwidth of the polar amplitude and phase signals. In this way, any nonlinearities (e.g., signal aliasing and unwrapping errors) in the translation of the OFDM data symbols of the I/Q components into the polar form amplitude and phase signals may be reduced or substantially eliminated. Furthermore, the sampling rate of the polar transmitter may be reduced, and, by extension, the power consumption of the electronic device 10 may be reduced.

Figure 6:
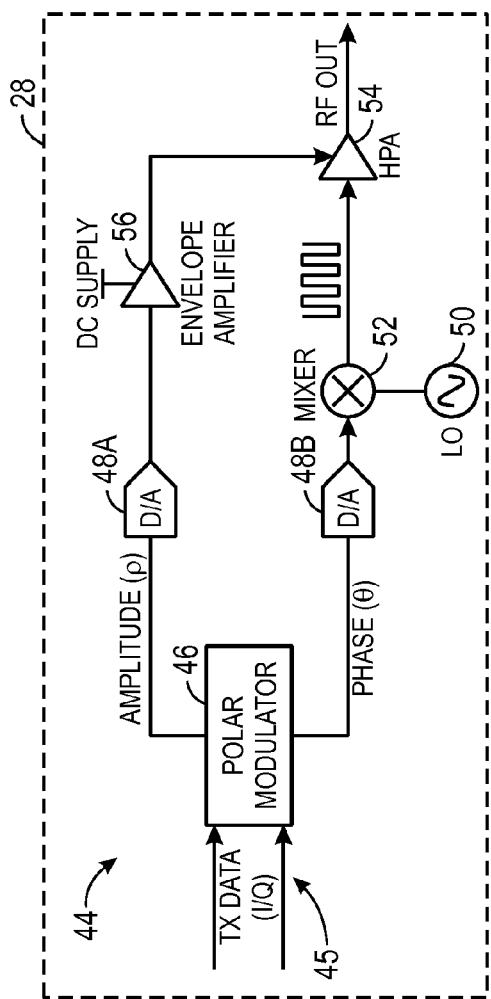
FIG. 6 is a block diagram of a transmitter of the transceiver included within the electronic device of FIG. 1, in accordance with an embodiment.

With the foregoing in mind, FIG. 6 depicts a transmitter 44 that may be included as part of the transceiver 28. Although not illustrated, it should be appreciated that the transceiver 28 may also include a receiver that may be coupled to the transmitter 44. As depicted, the transmitter 44 may receive a signal 45 that may be modulated via a polar modulator 46. In certain embodiments, the transmitter 44 may receive a Cartesian coordinate represented signal 45, which may include, for example, data symbols encoded according to orthogonal in-phase (I) and quadrature (Q) vectors. Thus, when an I/Q signal is converted into an electromagnetic wave (e.g., radio frequency (RF) signal, microwave signal, millimeter wave signal), the conversion is generally linear as the I/Q maybe frequency band-limited. However, in certain embodiments, the polar modulator 46 may be used to translate the I/Q vector components of the signal 45 into a polar coordinate representation of the signal 45, in which OFDM data symbols may be encoded according to an amplitude component and a phase component as illustrated.

For example, in certain embodiments, the polar modulator 46 may include a digital signal processor (DSP) or a coordinate rotation digital computer (CORDIC) that may be used to process and preprocess the individual Cartesian represented data symbols (e.g., OFDM symbols) into polar amplitude and phase components. However, as will be further appreciated, because polar amplitude and phase components may include a wide frequency band (e.g., an infinite frequency band), the polar signal converted into an electromagnetic signal may be a nonlinear conversion. This may lead to certain constellation points within the OFDM data symbols to be transmitted becoming distorted.

As further depicted in FIG. 6, the transmitter 44 may also include digital-to-analog converters (DACs) 48A and 48B that may be used to convert (e.g., sample) the polar amplitude component and the phase component of the signal 45 into digital signal components. As further illustrated, the phase component signal may be then passed to a mixer 52, which may be used to mix (e.g., upconvert or downconvert) the frequency of the polar phase component signal with the frequency of a local oscillator (LO) 50 to generate, for example, a radio frequency (RF) signal for transmission. In one embodiment, the polar amplitude component signal may be passed through an amplifier 56 (e.g., envelop amplifier) that may be used to track and adjust the envelope of the polar amplitude component signal. Lastly, the polar amplitude component signal and the polar phase component signal may be each passed to a high power amplifier (HPA) 54 to generate an electromagnetic signal (e.g., radio frequency (RF) signal, microwave signal, millimeter wave signal) at the RF frequency to transmit (e.g., via an antenna coupled to the transmitter 44).

In certain embodiments, as previously discussed, because polar amplitude and phase components may include a wide frequency band (e.g., an infinite frequency band), the polar signal converted into an electromagnetic signal may include a nonlinear conversion. Specifically, the amplitude signal the phase signal may include an "infinite" frequency bandwidth, and thus certain discontinuities or nonlinearities (e.g., a distortion of π radians and/or 180° phase shift) with respect to the constellation points of the OFDM data symbols may be introduced into the translation from the I/Q components to the polar amplitude and phase components. In one embodiment, the timing discontinuities or nonlinearities of the amplitude component signal and the phase component signal may be generally expressed as:

$$S_{out}(t) = A(t) \cdot e^{j\phi(t-\tau)} \quad \text{equation (1)}.$$

In equation (1), $S_{out}(t)$ may represent, for example, a continuous-time output signal (e.g., at the output of the amplifier 54), which may include a timing mismatch as indicated by the term t–τ. The term A(t) may represent a continuous-time amplitude of the output signal $S_{out}(t)$. Furthermore, due to the nonlinearities in the translation, the polar modulator 46 may be required to include an unsustainably high sampling rate (e.g., higher than the I/Q Nyquist frequency rate).

Figure 7:
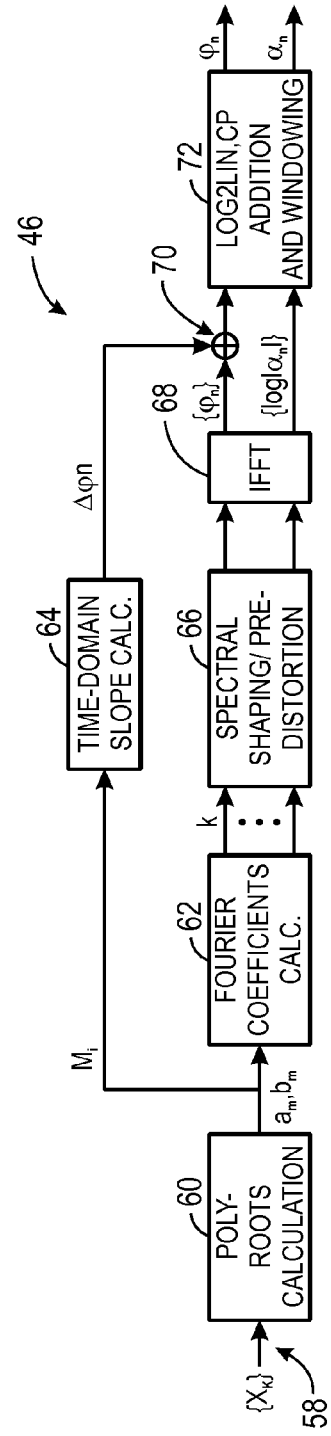
FIG. 7 is a block diagram of a polar modulator included as part of the transceiver of FIG. 6 and including a time-domain slope calculation block, in accordance with an embodiment.

Accordingly, as will be discussed with respect to FIG. 7, in certain embodiments, it may be useful to provide a transmitter 44 (e.g., OFDM polar transmitter) that includes a polar modulator 46 that may preprocess the polar coordinate amplitude and phase of the incoming I/Q signal to calculate a constant phase angle, a substantially linear slope, and a period of the polar amplitude, and to adjust the slope of the polar phase signal in the time-domain. In this way, the polar modulator 46 may generate a characterization of a finite bandwidth of the polar amplitude and phase signals. For example, as illustrated in FIG. 7, and as will be further appreciated, the polar modulator 46 may include a number of computational blocks (e.g., computational blocks 60, 62, 64, 68, and 72), which may be used to preprocess and adjust the polar coordinate amplitude and phase components of the incoming I/Q signal.

In certain embodiments, the computational blocks 60, 62, 64, 66, 68, and 72 may each include a software system, a hardware system, or some combination of hardware and software that may be implemented as part of the polar modulator 46 (e.g., DSP, CORDIC). During operation, for example, a frequency-domain (e.g., frequency-dependent) signal 58 (e.g., $\{X_k\}$) may be provided to polynomial roots calculation block 60. In one embodiment, the frequency-domain signal 58 (e.g., $\{X_k\}$) may include, for example, the complex Fourier coefficients of an OFDM data symbol or a stream of OFDM data symbols. The polynomial roots calculation block 60 may, in conjunction with the Fourier coefficients calculation block 62, the spectral shaping and pre-distortion calculation block 66, and the fast Fourier transform (FFT) and/or inverse fast Fourier transform (IFFT) block 68, be used to calculate a Fourier series representation of the amplitude component and the phase component. For example, in one embodiment, the time-domain (e.g., time-dependent) representation or form of the signal 58 (e.g., $\{X_k\}$) may be expressed as:

$$x(t) = \sum_{k=-N/2}^{\frac{N}{2}-1} X_k \cdot e^{j2\pi f_k t}. \quad \text{equation (2)}$$

In equation (2), x(t) may represent, for example, a time-domain function (e.g., continuous-time signal) of one or more OFDM data symbols included within an OFDM data signal, $f_k$ may represent the central frequency of the $k^{th}$ subcarrier, N the total number of subcarriers, and $X_k$ the complex coefficients. Specifically, an OFDM data signal may include a physical layer convergence procedure (PLCP) protocol data unit (PPDU) frame format, which may include approximately 52 subcarriers for data transmission. In equation (2), $f_k$ may represent the central frequency of the $k^{th}$ subcarrier or tone (e.g., k is the order of the subcarriers or frequency components of the time-domain function x(t)) of the time-domain function x(t) representing one or more OFDM data symbols and N may represent a total numbers of tones or subcarriers, and may be a function of a period $T_s$ of the time-domain function x(t). As noted above, the term $X_k$ may represent the complex coefficients (e.g., complex amplitude) of, for example, transmitted bits of the data symbols (e.g., OFDM data symbols).

In certain embodiments, the polynomial roots calculation block 60 may then transform the signal 58 (e.g., continuous signal x(t) of equation (2)) from the time-domain into the Z-domain to characterize the signal 58 in terms of the roots of the function, or more specifically, the poles and zeroes of the signal 58. For example, the Z-domain representation of the signal 58 (e.g., continuous signal x(t) of equation (2)) may be expressed as:

$$x(z) \stackrel{def}{=} \text{polynomial}\{Xk\} = \sum_{k=-\frac{N}{2}}^{\frac{N}{2}-1} X_k \cdot z^k = x(t), \qquad \text{equation (3)}$$

for $$z = e^{j\frac{2\pi}{T_s}t}.$$

In certain embodiments, once the polynomial roots calculation block 60 transforms the signal 58 (e.g., continuous signal x(t) of equation (2)) from the time-domain into the Z-domain, the polynomial roots calculation block 60 may then calculate the zeroes of the signal 58 (e.g., the Z-domain representation of the continuous signal x(t) of equation (2)) based on, for example, the fundamental theorem of algebra. Thus, the Z-domain representation x(z) of the signal 58 may be then expressed as:

$$x(z) = z^{M_i - N/2} \cdot \left( X_{\frac{N}{2}-1} \prod_{m=1}^{M_0} \left( \frac{-1}{b_m} \right) \right) \cdot \qquad \text{equation (4)}$$

$$\prod_{m=1}^{M_i}(1 - a_m z^{-1}) \cdot \prod_{m=1}^{M_0}(1 - bmz).$$

As illustrated in equation (4), the terms $\{a_m\}$ and $\{b_m\}$ may represent, for example, the zeros of the Z-domain representation x(z)(e.g., corresponding to the continuous signal x(t) of equation (2)) inside and outside of the unit circle (e.g., where $$z = e^{j\frac{2\pi}{T_s}t},$$

and graphically represented as a circle in the real and imaginary plane having a radius of approximately 1), respectively. In other embodiments, the polynomial roots calculation block 60 may calculate the zeroes $\{a_m\}$ and $\{b_m\}$ of the Z-domain representation x(z)(e.g., equation (4)) by way of, for example, generating a companion matrix of the Z-domain representation x(z)(e.g., equation (4)) through QR factorization.

In certain embodiments, once the polynomial roots calculation block 60 calculate the zeroes $\{a_m\}$ and $\{b_m\}$, the polynomial roots calculation block 60 may then pass the zeroes $\{a_m\}$ and $\{b_m\}$ to the Fourier series calculation block 62 and a slope $M_t$ to a time-domain slope calculation block 64. The Fourier series calculation block 62 may then utilize the zeroes $\{a_m\}$ and $\{b_m\}$ to calculate the Fourier coefficients of the phase and/or of the logarithm of the amplitude corresponding to each of the k subcarriers of the OFDM signal. Specifically, the Fourier series calculation block 62 may first calculate the logarithm of the Z-domain representation x(z)(e.g., equation (4)), which may be expressed as:

$$\log(x(z)) = \left(M_i - \frac{N}{2}\right)\log(z) + \log(A) + \qquad \text{equation (5)}$$

$$\sum_{m=1}^{M_0} \log(1 - a_m z^{-1}) + \sum_{m=1}^{M_i} \log(1 - b_m z^{-1}).$$

Then, performing a power series expansion of the terms $\Sigma_{m=1}^{M_0} \log(1-a_m z^{-1})$ and $\Sigma_{m=1}^{M_i} \log(1-b_m z^{-1})$ of equation (5), the Fourier series calculation block 62 may then generate an equality expression based on, for example, the logarithm of the of the Z-domain representation x(z) (e.g., equation (5)). For example, the equality expression generated by the Fourier series calculation block 62 may be expressed as:

$$\log(x(z)) = \qquad \text{equation (6)}$$

$$\left(M_i - \frac{N}{2}\right)(\log|z| + j\cdot\arg\{z\}) + (\log|A| + j\cdot\arg\{A\}) -$$

$$\sum_{m=1}^{M_i}\sum_{k=1}^{\infty}\frac{a_m^k \cdot z^{-k}}{k} - \sum_{m=1}^{M_0}\sum_{k=1}^{\infty}\frac{b_m^k \cdot z^k}{k}.$$

In certain embodiments, based on equation (6), the spectral shaping and pre-distortion calculation block 66 and the FFT and/or IFFT block 68 may then calculate the polar amplitude component and the phase component of the signal 58 (e.g., before the translation is completed), which may be expressed as:

$$\angle x(t) = \arg\{A\} + (M_i - N/2)\cdot\frac{2\pi}{T_s}\cdot t + \qquad \text{equation (7)}$$

$$\left(\sum_{k=1}^{\infty}\frac{1}{2j}\cdot\frac{1}{k}\cdot\left(\sum_{m=1}^{M_0}b_m^{*k} - \sum_{m=1}^{M_i}a_m^k\right)\cdot e^{-j\frac{2\pi}{T_s}k\cdot t} + \right.$$

$$\left.\sum_{k=1}^{\infty}\frac{1}{2j}\cdot\frac{1}{k}\cdot\left(\sum_{m=1}^{M_i}a_m^{*k} - \sum_{m=1}^{M_0}b_m^k\right)\cdot e^{j\frac{2\pi}{T_s}k\cdot t}\right).$$

In certain embodiments, based on the pre-calculation of the polar phase component of the signal 58 (e.g., equation (7)), the spectral shaping and pre-distortion calculation block 66 and the FFT and/or IFFT block 68 may then determine a constant phase angle (e.g., arg {A} illustrated in equation (7)), a substantially linear slope (e.g., $$\left(M_i - \frac{N}{2}\right)$$

illustrated in equation (7)), and a period (e.g., $T_s$ illustrated in equation (7)) of the polar phase component of the signal 58. While depicted as including both the spectral shaping and pre-distortion calculation block 66 and the FFT and/or IFFT block 68, in some embodiments, the polar modulator 46 may not include the spectral shaping and pre-distortion calculation block 66. Specifically, one or more of the aforementioned calculations and/or derivations may be performed by the FFT and/or IFFT block 68, which may be used to perform one or more fast Fourier transforms (FFTs) and/or inverse fast Fourier transforms (IFFTs) to compute one or more discrete Fourier transforms (DFTs) and/or inverse discrete Fourier transforms (IDFTs). Accordingly, based on equation (7), the FFT and/or IFFT block 68 may then derive respective expressions of the Fourier series expansion of the phase component and the logarithm of the amplitude component of the incoming signal. These expressions may be derived by the FFT and/or IFFT block 68 to characterize and analyze certain frequency characteristics (e.g., bandwidth) of the amplitude and phase components. For example, based on equation (7), the FFT and/or IFFT block 68 may derive the following expressions for the phase component and the logarithm of the amplitude component, respectively:

$$\hat{\varphi}_k = \begin{cases} \arg\{A\}, & k = 0 \\ \frac{1}{2j} \cdot \frac{1}{k} \cdot \left( -2 \cdot (M_i - N/2) \cdot (-1)^k + \sum_{m=1}^{M_i} a_m^{*k} - \sum_{m=1}^{M_o} b_m^k \right), & k > 0 \\ \frac{1}{2j} \cdot \frac{1}{k} \cdot \left( -2 \cdot (M_i - N/2) \cdot (-1)^k + \sum_{m=1}^{M_i} a_m^{-k} - \sum_{m=1}^{M_o} b_m^{*-k} \right), & k < 0 \end{cases} \quad \text{equation (8)}$$

$$\hat{\alpha}_k = \begin{cases} \log|A|, & k = 0 \\ -\frac{1}{2} \cdot \frac{1}{k} \cdot \left( \sum_{m=1}^{M_i} a_m^{*k} + \sum_{m=1}^{M_o} b_m^k \right), & k > 0 \\ \frac{1}{2} \cdot \frac{1}{k} \cdot \left( \sum_{m=1}^{M_i} a_m^{-k} + \sum_{m=1}^{M_o} b_m^{*-k} \right), & k < 0 \end{cases} \quad \text{equation (9)}$$

As may be appreciated from equation (8) and equation (9), the zeroes $\{a_m\}$ and $\{b_m\}$ may, in some embodiments, cluster near the unit circle, and thus the polar modulator 46 may determine that the probability that a zero (e.g., $\{a_m\}$, $\{b_m\}$) will occur precisely on the unit circle is low. Indeed, in certain embodiments, the powers of expressions $$\frac{1}{k} \sum_{m=1}^{M_i} a_m^k \text{ and } \frac{1}{k} \sum_{m=1}^{M_o} b_m^k$$

may decay at a relatively fast rate (e.g., at a rate greater than approximately $$\frac{1}{k^2} ).$$

Thus, the polar modulator 46 (e.g., DSP, CORDIC) may derive a frequency bandwidth (e.g., although the frequency bandwidth of the polar phase component may be theoretically infinite) of the phase component as expressed by equation (8). Specifically, the polar modulator 46 (e.g., DSP, CORDIC) may determine the frequency bandwidth of the phase component based on the Fourier coefficients of the linear slope of the phase component, or more aptly, expressions:

$$2 \cdot \left( M_i - \frac{N}{2} \right) \cdot (-1)^k \text{ and } -2 \cdot \left( M_i - \frac{N}{2} \right) \cdot (-1)^k.$$

In some embodiments, the linear slope of the phase component (e.g., $$2 \cdot \left( M_i - \frac{N}{2} \right) \cdot (-1)^k \text{ and } -2 \cdot \left( M_i - \frac{N}{2} \right) \cdot (-1)^k )$$

may induce one or more nonlinearities or discontinuities at the edges of the OFDM data symbols for which $$M_i \neq \frac{N}{2},$$

and such that a truncation of the Fourier series (e.g., equations (8) and (9)) may induce a distortion of the OFDM data symbols due to, for example, Gibbs phenomenon.

Accordingly, in certain embodiments, to correct any discontinuities or nonlinearities in the translation of, for example, the I/Q signal 45 to the amplitude component and the phase component as expressed above with respect to equation (8) and equation (9), the time-domain slope calculation block 64 may be provided to receive the slope value $M_i$ and to derive an adjusted slope of the phase component (e.g., $\Delta\phi_n$) in the time-domain based on the zeroes (e.g., $\{a_m\}$ $\{b_m\}$) and/or the Fourier coefficients. Specifically, as depicted in FIG. 7, the time-domain slope calculation block 64 may adjust the phase slope (e.g., $M_i$) and generate a change in phase value (e.g., $\Delta\phi_n$), and may thereby decouple the derivation of the slope of the phase component from the generation of the frequency-domain phase component (e.g., $\phi_k$) expressed by equation (8).

The change in phase value (e.g., $\Delta\phi_n$) may be then added to the time-domain phase component (e.g., $\{\phi_n\}$) via a summing component 70 (e.g., adder) in the time-domain as illustrated in FIG. 7. In this way, as the frequency bandwidth of the phase component (e.g., $\phi_k$) may be dependent upon the Fourier coefficients of the phase slope, the frequency bandwidth of the polar phase component (e.g., $\{\phi_n\}$) may be decreased (e.g., narrowed), such that the frequency bandwidth of the phase component becomes substantially finite. In the same way, the number of Fourier coefficients may be decreased by decoupling the phase slope derivation by way of the time-domain slope calculation block 64 from the generation of the frequency-domain phase component (e.g., $\phi_k$), and adding the change in phase value (e.g., $\Delta\phi_n$) to the time-domain phase component (e.g., $\{\phi_n\}$) in the time-domain. Thus As further illustrated, the phase component (e.g., $\{\phi_n\}$) and the logarithm of the amplitude component (e.g., $\{\log|a_n|\}$)) may be each passed to a log-to-linear conversion module, cyclic prefix addition and windowing block 72 to, for example, equalize or limit the phase component (e.g., $\{\phi_n\}$) and the logarithm of the amplitude component (e.g., $\{\log|a_n|\}$), and to generate time-domain translated phase component (e.g., $\phi_n$) and amplitude component (e.g., $a_n$) to be recombined and transmitted.

Figure 8:
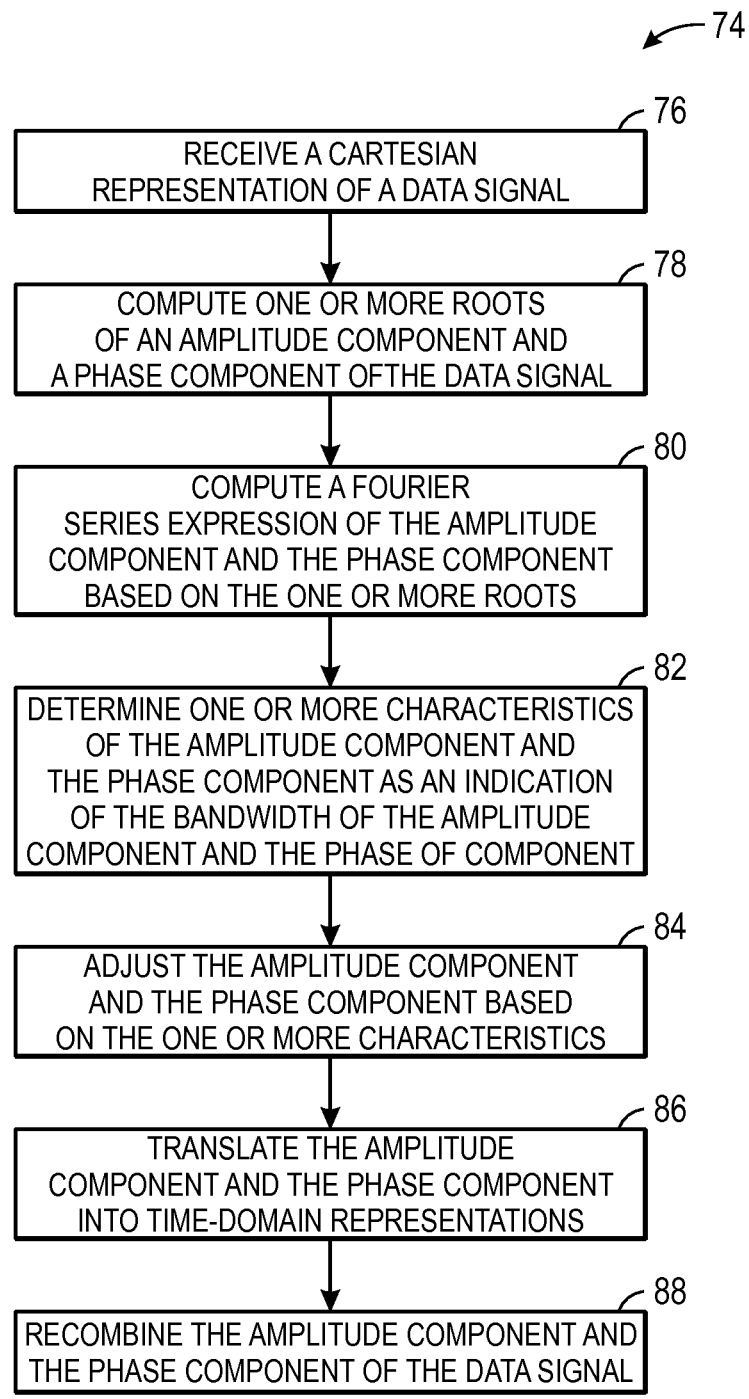
FIG. 8 is a flow diagram illustrating an embodiment of a process useful in reducing and/or substantially preventing nonlinearities and discontinuities during the translation stage from an I/Q signal into a polar coordinate OFDM signal, in accordance with an embodiment.

Turning now to FIG. 8, a flow diagram is presented, illustrating an embodiment of a process 74 useful in reducing and/or substantially preventing nonlinearities and discontinuities in OFDM symbols during the translation stage from an I/Q signal into a polar coordinate OFDM signal by using, for example, the polar modulator 46 included within the transceiver 28 depicted in FIG. 1. The process 74 may include code or instructions stored in a non-transitory machine-readable medium (e.g., the memory 14) and executed, for example, by the one or more processor(s) 12 and/or the polar modulator 46 included within the system 10 and illustrated in FIG. 6. The process 74 may begin with the polar modulator 46 receiving (block 76) a Cartesian representation of a data signal. For example, the polar modulator 46 may receive a Cartesian coordinate represented signal 45, which may include, for example, data symbols encoded according to orthogonal I/Q vectors.

The process 74 may then continue with the polar modulator 46 computing (block 78) one or more roots of an amplitude component and a phase component of the data signal. For example, as discussed above with respect to FIG. 7, the polar modulator 46 may calculate the zeroes of the amplitude component and the phase component of the received data signal. The process 74 may then continue with the polar modulator 46 computing (block 80) one or more Fourier series expressions of the amplitude component and the phase component based on the calculated roots (e.g., zeroes). The process 74 may then continue with the polar modulator 46 determining (block 82) one or more characteristics of the amplitude component and the phase component as an indication of the bandwidth of the amplitude component and the phase component. Specifically, as previously noted, the polar modulator 46 may determine the frequency bandwidth (e.g., substantially finite bandwidth) of the phase component based on, for example, the Fourier coefficients of the linear slope of the phase component. The polar modulator 46 may also determine the frequency bandwidth (e.g., substantially finite bandwidth) of the amplitude component based on, for example, the Fourier coefficients of the amplitude component.

The process 74 may then continue with the polar modulator 46 adjusting (block 84) the amplitude component and the phase component based on the one or more characteristics. For example, as discussed above with respect to FIG. 7, the polar modulator 46 may adjust the phase slope (e.g., $M_i$) and generate a change in phase value (e.g., $\Delta\phi_n$), and may thereby decouple the derivation of the slope of the phase component from the generation of the frequency-domain phase component (e.g., $\phi_k$). In this way, as the frequency bandwidth of the phase component (e.g., $\phi_k$) may be dependent upon the Fourier coefficients of the phase slope, the frequency bandwidth of the polar phase component (e.g., $\{\phi_n\}$) may be narrowed (e.g., such that the frequency bandwidth becomes substantially finite) and the number of Fourier coefficients may be decreased. In this way, any nonlinearities or discontinuities (e.g., signal aliasing and unwrapping errors) in the translation of the OFDM symbols of the I/Q components into the polar form amplitude and phase components may be reduced or substantially eliminated. Furthermore, the sampling rate of the polar transmitter 44 may be reduced, and, by extension, the power consumption of the electronic device 10 may be reduced.

The process 74 may then continue with the polar modulator 46 translating (block 86) the amplitude component and the phase component into time-domain representations. For example, the polar modulator may translate the Fourier series expressions of the amplitude component and the phase component into time-domain signals. The process 74 may then conclude with the polar modulator 46 recombining (block 90) the amplitude component and the phase component of the data signal. For example, the polar modulator 46 may recombined the time-domain translated phase component (e.g., $\phi_n$) and amplitude component (e.g., $a_n$) into one or more polar coordinate data signals (e.g., polar OFDM data signals) to be transmitted via, for example, an antenna of the transmitter 44.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method, comprising:
   receiving an incoming data signal via a processor of a transmitter, wherein the data signal comprises an in-phase (I) component and a quadrature (Q) component;
   computing one or more roots of a first function representing a phase component of the data signal in a first domain;
   computing a second function representing the phase component based at least in part on the one or more roots;
   deriving one or more characteristics of the phase component based at least in part on the second function, wherein deriving the one or more characteristics of the phase component comprises determining a constant angle, a linear slope, a period, or a combination thereof, of the phase component, and wherein the one or more characteristics comprises an indication of a bandwidth of the phase component;
   adjusting at least one of the one or more characteristics in a second domain to establish a substantially finite bandwidth of the phase component; and
   recombining an amplitude component and the phase component in the second domain.

2. The method of claim 1, wherein receiving the incoming data signal comprises receiving a Cartesian coordinate representation of the data signal.

3. The method of claim 1, wherein receiving the incoming data signal comprises receiving one or more orthogonal frequency division multiplexing (OFDM) data symbols.

4. The method of claim 1, wherein computing the one or more roots of the first function comprises computing one or more zeroes of the first function in a frequency domain.

5. The method of claim 1, wherein computing the second function representing the phase component comprises computing a Fourier series expression of the phase component.

6. The method of claim 1, wherein deriving the one or more characteristics of the phase component comprises deriving a slope of the phase component.

7. The method of claim 6, wherein deriving the slope comprises deriving a linear slope of the phase component, and wherein one or more Fourier coefficients of the linear slope comprises the indication of the bandwidth.

8. The method of claim 1, wherein adjusting the at least one of the one or more characteristics in the second domain comprises:
   deriving a slope of the phase component in a time domain, wherein deriving the slope in the time domain comprises generating a change in phase value; and
   combining the change in phase value with the second function representing the phase component in the time domain.

9. The method of claim 8, wherein deriving the slope in the time domain comprises limiting the bandwidth of the phase component to establish the substantially finite bandwidth and decreasing a number of Fourier coefficients of the second function.

10. An electronic device, comprising:
a transmitter, comprising:
  a polar modulator device configured to:
    receive a first signal comprising orthogonal frequency division multiplexing (OFDM) data symbols encoded according to in-phase/quadrature (I/Q) vectors;
    calculate one or more zeroes of the first signal;
    calculate a Fourier series expansion of a phase component of the first signal based on the one or more zeroes, wherein the Fourier series expansion comprises a slope of the phase component;
    adjust the slope of the phase component in a time domain to generate a finite bandwidth of the phase component; and
    combine an amplitude component and the phase component; and
  an amplifier configured to generate an electromagnetic signal based on the combined amplitude component and phase component for transmission.

11. The electronic device of claim 10, wherein the polar modulator device is configured to calculate a Fourier series expansion of the amplitude component of the first signal based on the one or more zeroes.

12. The electronic device of claim 10, wherein the polar modulator device is configured to adjust the slope of the phase component by generating a phase slope value in the time domain and adding the phase slope value to a time domain representation of the phase component.

13. The electronic device of claim 10, wherein the slope comprises a plurality of Fourier coefficients, and wherein the polar modulator device is configured to adjust the slope of the phase component by truncating one or more of the plurality of Fourier coefficients.

14. The electronic device of claim 10, wherein the polar modulator device is configured to adjust the slope of the phase component to decrease a bandwidth of the phase component.

15. A method, comprising:
receiving a Cartesian coordinate form of an orthogonal frequency division multiplexing (OFDM) data signal via a processor of an electronic device;
deriving an expression of an amplitude component of the OFDM data signal;
deriving an expression of a phase component of the OFDM data signal; and
deriving a slope $M_i$ of the phase component, wherein deriving the slope $M_i$ comprises deriving the slope of the phase component in a time domain;
deriving a change in phase slope $\Delta\phi_n$ in the time domain based at least in part on the derived slope $M_i$, wherein i comprises a discrete time interval of the OFDM signal; and
combining the change in phase slope $\Delta\phi_n$ with a time domain representation of the phase component $\{\Delta\phi_n\}$ in the time domain.

16. The method of claim 15, wherein receiving the Cartesian coordinate form of the OFDM data signal comprises receiving a plurality of OFDM data symbols stored into at least a subset of approximately 52 subcarriers of the OFDM data signal.

17. The method of claim 15, wherein deriving the expression of the amplitude component comprises deriving an amplitude component expressed by:

$$\hat{a}_k = \begin{cases} \log|A|, & k = 0 \\ -\frac{1}{2} \cdot \frac{1}{k} \cdot \left( \sum_{m=1}^{M_i} a_m^{*k} + \sum_{m=1}^{M_o} b_m^k \right), & k > 0 \\ \frac{1}{2} \cdot \frac{1}{k} \cdot \left( \sum_{m=1}^{M_i} a_m^{-k} + \sum_{m=1}^{M_o} b_m^{*-k} \right), & k < 0 \end{cases}.$$

18. The method of claim 15, wherein deriving the expression of the phase component comprises deriving a phase component expressed by:

$$\hat{\varphi}_k = \begin{cases} \arg\{A\}, & k = 0 \\ \frac{1}{2j} \cdot \frac{1}{k} \cdot \left( \begin{array}{c} -2 \cdot (M_i - N/2) \cdot (-1)^k + \\ \sum_{m=1}^{M_i} a_m^{*k} - \sum_{m=1}^{M_o} b_m^k \end{array} \right), & k > 0 \\ \frac{1}{2j} \cdot \frac{1}{k} \cdot \left( \begin{array}{c} -2 \cdot (M_i - N/2) \cdot (-1)^k + \\ \sum_{m=1}^{M_i} a_m^{-k} - \sum_{m=1}^{M_o} b_m^{*-k} \end{array} \right), & k < 0 \end{cases}.$$

19. The method of claim 18, wherein deriving the expression of the phase component comprises deriving a plurality of Fourier coefficients of a linear slope of the phase component, and wherein the plurality of Fourier coefficients of the linear slope is expressed by:

$$2 \cdot \left( M_i - \frac{N}{2} \right) \cdot (-1)^k, \ -2 \cdot \left( M_i - \frac{N}{2} \right) \cdot (-1)^k,$$

or a combination thereof.

20. The method of claim 19, wherein deriving the slope of the phase component in the time domain comprises decreasing a number of the plurality of Fourier coefficients.

21. The method of claim 15, wherein combining the change in phase slope $\Delta\phi_n$ with the time domain representation of the phase component $\{\Delta\phi_n\}$ in the time domain comprises decreasing a bandwidth of the phase component.

22. The method of claim 15, comprising:
combining the amplitude component and the phase component to generate a polar coordinate form OFDM transmission signal;
generating an electromagnetic signal via an amplifier of the electronic device based on the polar coordinate form OFDM transmission signal; and
transmitting the electromagnetic signal.

23. A non-transitory computer-readable medium having computer executable code stored thereon, the code comprising instructions to:
cause a processor to receive a signal via a processor of a transmitter, wherein the signal comprises an I/Q signal;
cause the processor to translate the I/Q signal into a polar signal, wherein the polar signal comprises an amplitude and a phase;
cause the processor to compute one or more zeroes of a first function representing the phase and the amplitude in a frequency domain;
cause the processor to compute a second function representing the phase based at least in part on the one or more zeroes;
cause the processor to generate a slope of the phase in a time domain based on the second function, wherein the slope comprises an indication of a bandwidth of the phase, and wherein generating the slope in the time domain comprises generating a change in phase value in the time domain; and cause the processor to adjust the slope in a time domain to limit the bandwidth of the phase to a substantially finite value.

24. The non-transitory computer-readable medium of claim 23, wherein the code comprises instructions to combine the change in phase value with the second function representing the phase in the time domain.

* * * * *